US009839020B2

United States Patent
Seo et al.

(10) Patent No.: US 9,839,020 B2
(45) Date of Patent: Dec. 5, 2017

(54) METHOD AND DEVICE FOR RECEIVING CONTROL INFORMATION IN WIRELESS COMMUNICATION SYSTEM

(71) Applicant: LG Electronics Inc., Seoul (KR)

(72) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 14/434,636

(22) PCT Filed: Oct. 30, 2013

(86) PCT No.: PCT/KR2013/009736
§ 371 (c)(1),
(2) Date: Apr. 9, 2015

(87) PCT Pub. No.: WO2014/069895
PCT Pub. Date: May 8, 2014

(65) Prior Publication Data
US 2015/0289236 A1   Oct. 8, 2015

Related U.S. Application Data

(60) Provisional application No. 61/721,018, filed on Oct. 31, 2012, provisional application No. 61/721,479, filed on Nov. 1, 2012.

(51) Int. Cl.
*H04W 72/04* (2009.01)
*H04J 11/00* (2006.01)
(Continued)

(52) U.S. Cl.
CPC ....... *H04W 72/042* (2013.01); *H04J 11/0023* (2013.01); *H04J 13/16* (2013.01);
(Continued)

(58) Field of Classification Search
None
See application file for complete search history.

(56) References Cited

U.S. PATENT DOCUMENTS

2013/0170449 A1* 7/2013 Chen .................. H04L 1/0038
370/329
2013/0194931 A1* 8/2013 Lee .................... H04L 5/0053
370/241
(Continued)

OTHER PUBLICATIONS

Samsung, "Monitoring of EPDCCH Types and EPDCCH Subframes", R1-124380, GPP TSG RAN WG1 #70bis, San Diego, USA, Oct. 8-12, 2012.
(Continued)

*Primary Examiner* — Hicham Foud
(74) *Attorney, Agent, or Firm* — Dentons US LLP (57) ABSTRACT

The present invention relates to a wireless communication system. More specifically, the present invention relates to a method and apparatus for receiving control information through an enhanced physical downlink control channel (EPDCCH), the method includes receiving a subframe which includes one or more EPDCCH physical resource block (PRB) sets, and attempting to decode one or more EPDCCH candidates in each of the EPDCCH PRB sets. When the transmission areas of the EPDCCH PRB set and a first signal overlap with each other, information relating to the EPDCCH candidate or information relating to the decoding is determined to be different according to one or both of EPDCCH PRB set type and/or cell identity (ID).

10 Claims, 8 Drawing Sheets (51) Int. Cl.
*H04J 13/16* (2011.01)
*H04L 5/00* (2006.01)
*H04W 48/12* (2009.01)
*H04L 1/00* (2006.01)

(52) U.S. Cl.
CPC .......... *H04L 1/0046* (2013.01); *H04L 5/0053* (2013.01); *H04L 5/0092* (2013.01); *H04W 48/12* (2013.01); *H04L 5/0026* (2013.01)

(56) References Cited

U.S. PATENT DOCUMENTS

| | | | | | |
|---|---|---|---|---|---|
| 2013/0201942 | A1* | 8/2013 | Kim | .................... | H04W 76/045 370/329 |
| 2013/0201975 | A1* | 8/2013 | Chen | ................ | H04W 72/0446 370/336 |
| 2013/0294368 | A1* | 11/2013 | Bendlin | .............. | H04W 72/042 370/329 |
| 2014/0036789 | A1* | 2/2014 | Miao | .................... | H04W 72/04 370/329 |
| 2014/0071934 | A1* | 3/2014 | Frenne | .................... | H04L 5/001 370/330 |
| 2014/0078980 | A1* | 3/2014 | Frenne | ................. | H04L 5/0007 370/329 |
| 2014/0092821 | A1* | 4/2014 | Zhu | .................. | H04W 52/0258 370/329 |

OTHER PUBLICATIONS

Interdigital Communications, LLC., "PRS collision handling for ePDCCH", R1-123408, 3GPP TSG RAN WG1 Meeting #70, Qingdao, China, Aug. 13-17, 2012.

New Postcom., "RE mapping for ePDCCH in presence of other channels and signals", R1-123429, 3GPP TSG RAN WG1 Meeing #70, Qingdao, China, Aug. 13-17, 2012.

Qualcomm Incorporated, "Configurations of Subframes for Monitoring ePDCCH", R1-124450, 3GPP TSG RAN WG1 #70bis, San Diego, USA, Oct. 8-12, 2012.

ZTE, "Discussion on ePDCCH restriction subframe clusters", R1-123376, 3GPP TSG RAN WG1 Meeting #70, Qingdao, China, Aug. 13-17, 2012.

* cited by examiner

Antenna port 7

Antenna port 8

Antenna port 9

Antenna port 10

METHOD AND DEVICE FOR RECEIVING CONTROL INFORMATION IN WIRELESS COMMUNICATION SYSTEM

This Application is a 35 U.S.C. §371 National Stage entry of International Application No. PCT/KR2013/009736, filed Oct. 30, 2013, which claims benefit of Provisional Application Nos. 61/721,018 filed Oct. 31, 2012 and 61/721,479 filed Nov. 1, 2012, all of which are incorporated by reference in their entirety herein.

TECHNICAL FIELD

The present invention relates to a wireless communication system, and more particularly, to a method and apparatus for receiving control information on an Enhanced Physical Downlink Control Channel (EPDCCH).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide an operation of a User Equipment (UE) when the UE receives control information on an EPDCCH, particularly when a Positioning Reference Signal (PRS) transmission area is overlapped with an EPDCCH-associated DeModulation Reference Signal (DMRS).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving control information on an Enhanced Physical Downlink Control Channel (EPDCCH) by a User Equipment (UE) in a wireless communication system includes receiving a subframe including one or more EPDCCH Physical Resource Block (PRB) sets, and attempting to decode one or more EPDCCH candidates in each of the EPDCCH PRB sets. If the EPDCCH PRB set is overlapped with a transmission area of a first signal, information about the EPDCCH candidates or information about decoding is determined differently according to at least one of a type of the EPDCCH PRB set and a cell Identity (ID).

In another aspect of the present invention, a UE for receiving a downlink signal on an EPDCCH in a wireless communication system includes a reception module, and a processor. The processor is configured to receive a subframe including one or more EPDCCH PRB sets, and to attempt to decode one or more EPDCCH candidates in each of the EPDCCH PRB sets. If the EPDCCH PRB set is overlapped with a transmission area of a first signal, information about the EPDCCH candidates or information about decoding is determined differently according to at least one of a type of the EPDCCH PRB set and a cell ID.

The first and second aspects of the present invention may include the followings.

If the EPDCCH PRB set overlapped with the transmission area of the first signal is for localized EPDCCH transmission, the number of EPDCCH candidates may be determined according to the size of the EPDCCH PRB set, taking into account a PRB pair overlapped with the transmission area of the first signal.

The size of the EPDCCH PRB set may be a value available as the number of PRB pairs included in the EPDCCH PRB set, which does not exceed a value obtained by subtracting the number of PRB pairs overlapped with the transmission area of the first signal from the number of PRB pairs included in the EPDCCH PRB set, indicated by higher-layer signaling.

If the value obtained by subtracting the number of PRB pairs overlapped with the transmission area of the first signal from the number of PRB pairs included in the EPDCCH PRB set, indicated by higher-layer signaling is smaller than a predetermined value, the EPDCCH PRB set may be determined to be invalid.

The information about the EPDCCH candidates may be the number of the EPDCCH candidates.

If the EPDCCH PRB set overlapped with the transmission area of the first signal is for localized EPDCCH transmission, an EPDCCH candidate corresponding to the overlapped area may be determined to be invalid.

If a cell ID of the UE causes overlap between a Resource Element (RE) carrying the first signal and an RE of one of Code Division Multiplexing (CDM) groups of EPDCCH-associated DeModulation Reference Signals (DMRSs), one antenna port may be allocated to two Enhanced Control Channel Elements (ECCEs) in a PRB pair overlapped with the transmission area of the first signal.

The one antenna port allocated to the two ECCEs may belong to a CDM group other than the one CDM group.

The PRB pair overlapped with the transmission area of the first signal may be included in an EPDCCH PRB set for localized EPDCCH transmission.

If a cell ID of the UE causes overlap between a Resource Element (RE) carrying the first signal and an RE of one of CDM groups of EPDCCH-associated DMRSs, one ECCE may include eight Enhanced RE Groups (EREGs) in a PRB pair overlapped with the transmission area of the first signal.

The information about decoding may include information about an antenna port allocated to an ECCE and the number of EREGs included in the ECCE.

The first signal may be a Positioning Reference Signal (PRS).

Advantageous Effects

According to the present invention, even though a Positioning Reference Signal (PRS) transmission area is overlapped with an Enhanced Physical Downlink Control Channel (EPDCCH)-associated DeModulation Reference Signal (DMRS), an EPDCCH can be decoded without affecting much of channel estimation.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 1(a) and (b) illustrate a radio frame structure;

FIGS. 5(a) and (b) illustrate a Reference Signal (RS);

BEST MODE FOR CARRYING OUT THE INVENTION

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Figure 1:
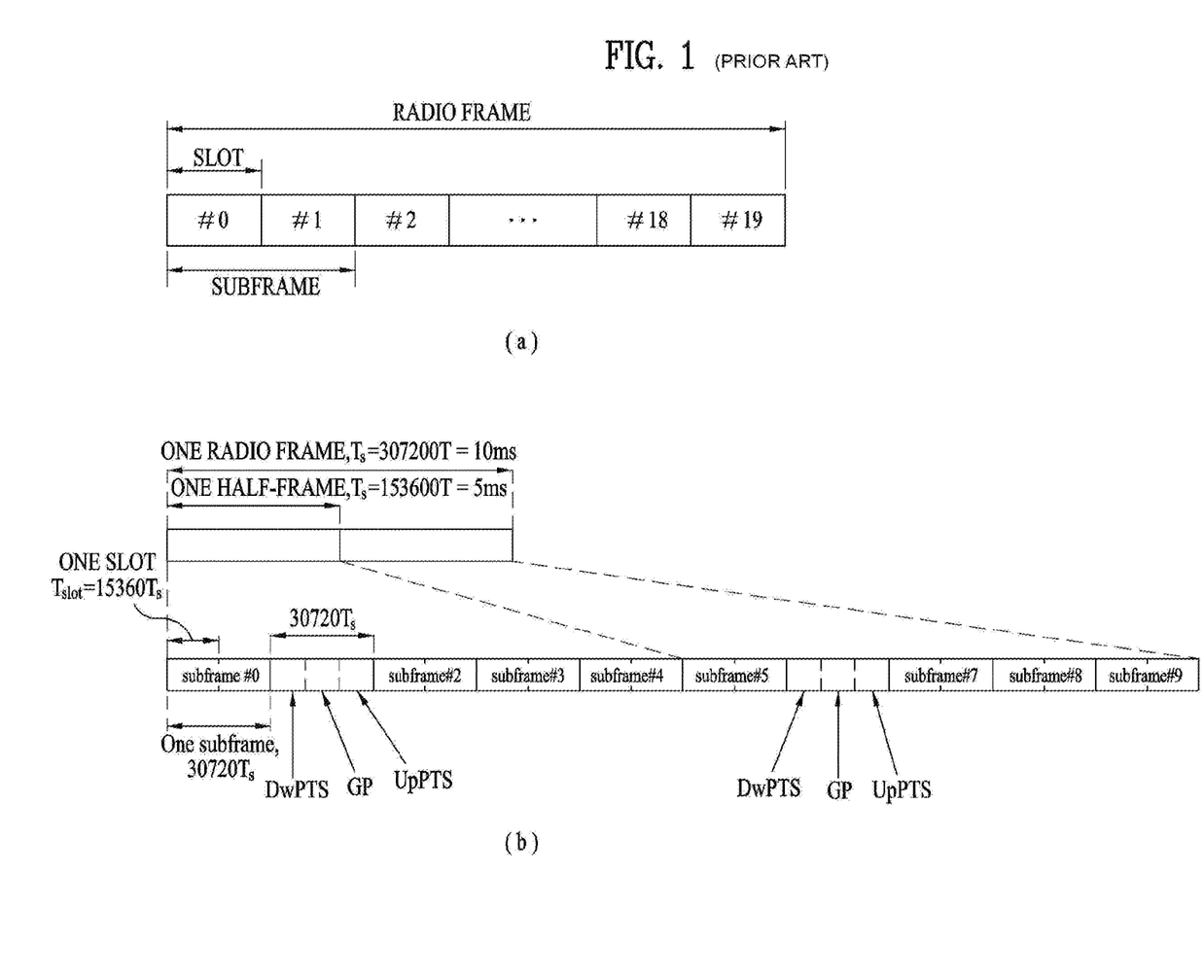

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
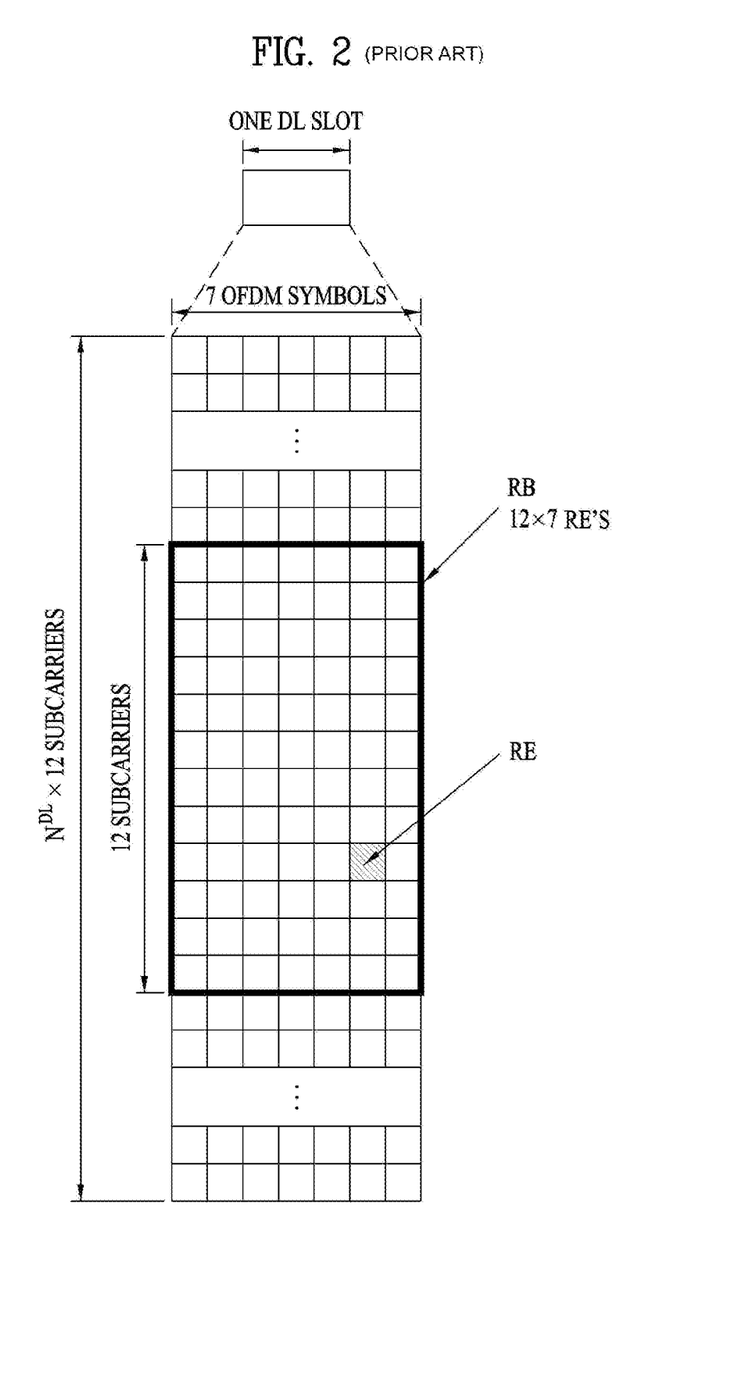
FIG. 2 illustrates a structure of a downlink resource grid for the duration of one downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
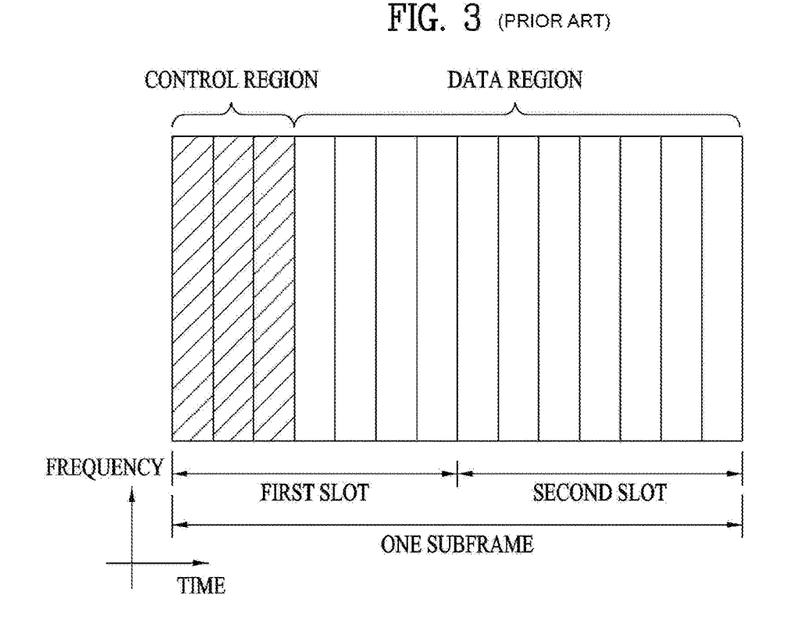
FIG. 3 illustrates a structure of a downlink subframe.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
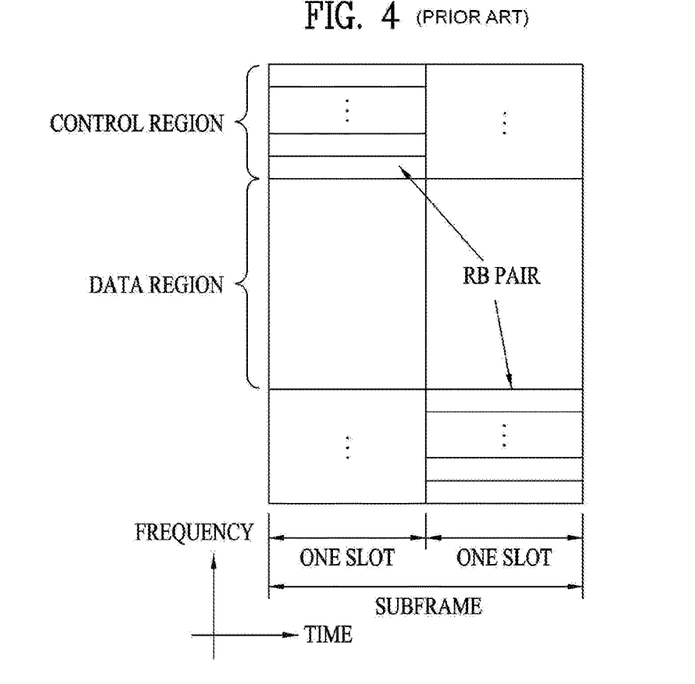
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Reference Signal (RS)

In a wireless communication system, a packet is transmitted on a radio channel. In view of the nature of the radio channel, the packet may be distorted during transmission. To receive the signal successfully, a receiver should compensate for the distortion of the received signal using channel information. Generally, to enable the receiver to acquire the channel information, a transmitter transmits a signal known to both the transmitter and the receiver and the receiver acquires channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each individual antenna, particularly through each individual antenna port.

RSs may be divided into DL RSs and UL RSs. In the current LTE system, the UL RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of a UL channel in a different frequency.

The DL RSs include:

i) Cell-specific Reference Signal (CRS) shared among all UEs of a cell;

ii) UE-specific RS dedicated to a specific UE;

iii) DMRS used for coherent demodulation of a PDSCH, when the PDSCH is transmitted;

iv) Channel State Information-Reference Signal (CSI-RS) carrying CSI, when DL DMRS is transmitted;

v) Multimedia Broadcast Single Frequency Network (MBSFN) RS used for coherent demodulation of a signal transmitted in MBSFN mode; and vi) Positioning RS (PRS) used to estimate geographical position information about a UE.

RSs may also be divided into two types according to their purposes: RS for channel information acquisition and RS for data demodulation. Since its purpose lies in that a UE acquires DL channel information, the former should be transmitted in a broad band and received even by a UE that does not receive DL data in a specific subframe. This RS is also used in a situation like handover. The latter is an RS that an eNB transmits along with DL data in specific resources. A UE can demodulate the data by measuring a channel using the RS. This RS should be transmitted in a data transmission area.

CRS serves two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna port 0 and antenna port 1 are transmitted. In the case of four Tx antennas, CRSs for antenna port 0 to antenna port 3 are transmitted respectively.

Figure 5:
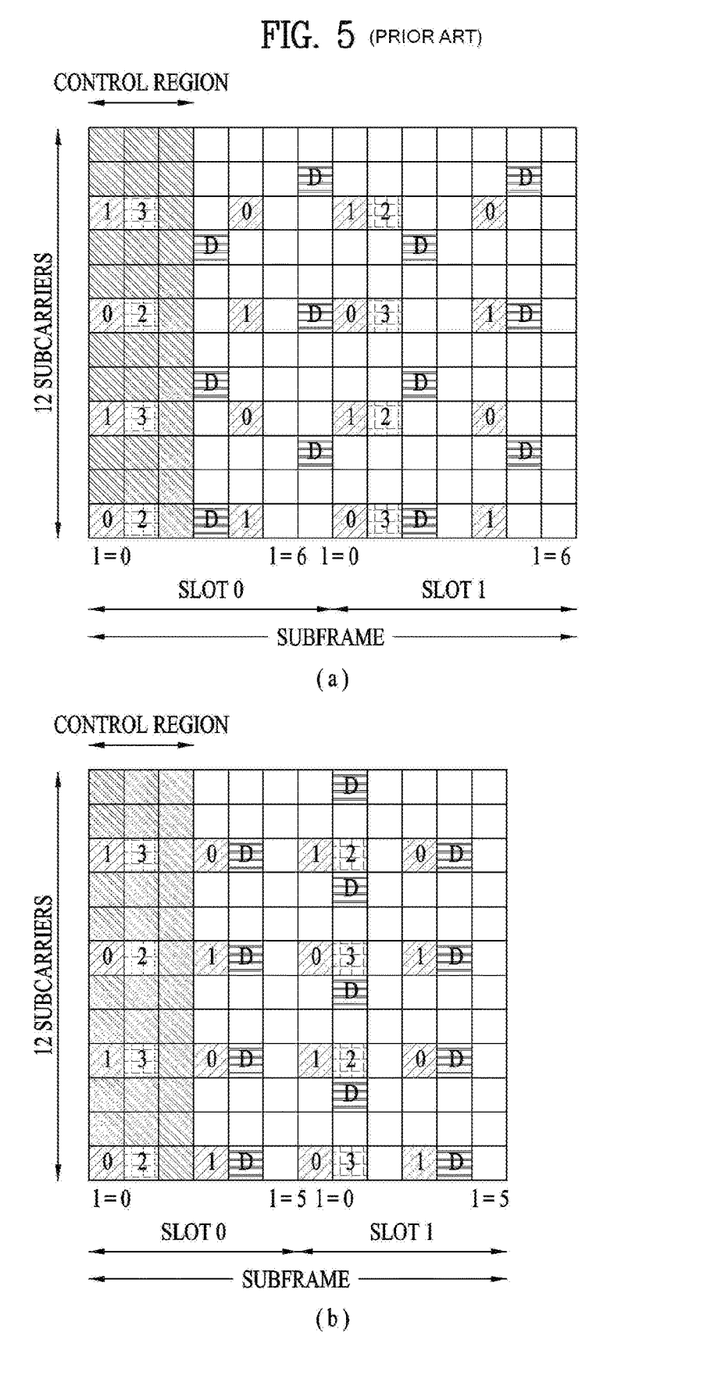

FIG. 5 illustrates patterns in which CRSs and DRSs are mapped to a DL RB pair, as defined in a legacy 3GPP LTE system (e.g., conforming to Release-8). An RS mapping unit, i.e., a DL RB pair may include one subframe in time by 12 subcarriers in frequency. That is, an RB pair includes 14 OFDM symbols in time in the case of normal CP (see FIG. 5(a)) and 12 OFDM symbols in time in the case of extended CP (see FIG. 5(b)).

In FIG. 5, the positions of RSs in an RB pair for a system where an eNB supports four Tx antennas are illustrated. Reference numerals '0', '1', '2' and '3' denote the REs of CRSs for antenna port 0 to antenna port 3, respectively, and reference character 'D' denotes the positions of DMRSs.

DeModulation Reference Signal (DMRS)

DMRS is an RS defined for the purpose of a UE's channel estimation for a PDSCH. DMRSs may be used in Transmission Modes (TMs) 7, 8, and 9. While DMRS was initially defined for single layer transmission through antenna port 5, the DMRS was extended to spatial multiplexing of up to eight layers.

Figure 6:
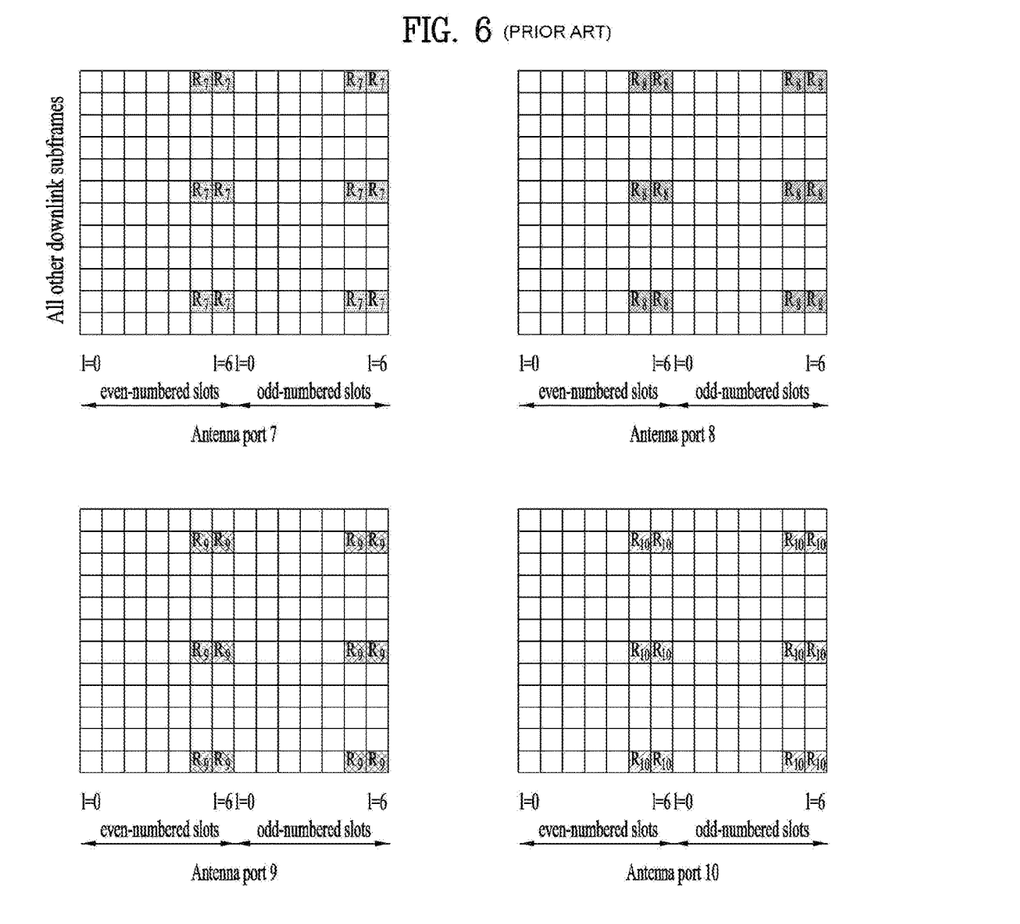
FIG. 6 illustrates DeModulation Reference Signal (DMRS)

DMRSs are generated for up to eight layers in the following manner. DMRSs may be transmitted by mapping an RS sequence r(m) generated according to [Equation 1] to complex-valued modulation symbols $a_{k,l}^{(p)}$ according to [Equation 2]. FIG. 6 illustrates DMRSs mapped to a resource grid in a subframe, for antenna ports 7 to 10 in the case of normal CP.

$$r(m) = \frac{1}{\sqrt{2}}(1 - 2 \cdot c(2m)) + j\frac{1}{\sqrt{2}}(1 - 2 \cdot c(2m+1)),$$ [Equation 1]

$$m = \begin{cases} 0, 1, \ldots, 12N_{RB}^{max,DL} - 1 & \text{(normal CP)} \\ 0, 1, \ldots, 16N_{RB}^{max,DL} - 1 & \text{(extended CP)} \end{cases}$$

In Equation 1, r(m) represents an RS sequence, c(i) represents a pseudorandom sequence, and $N_{RB}^{max,DL}$ represents a maximum number of RBs in a DL bandwidth.

$$a_{k,l}^{(p)} = w_p(l') \cdot r(3 \cdot l' \cdot N_{RB}^{max,DL} + 3 \cdot n_{PRB} + m')$$ [Equation 2]

$$w_p(i) = \begin{cases} \overline{w_p}(i) & (m' + n_{PRB}) \bmod 2 = 0 \\ \overline{w_p}(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{for special subframe configurations 3, 4, 8, and 9} \\ l' \bmod 2 + 2 + 3\lfloor l'/2 \rfloor & \text{for special subframe configurations 1, 2, 6, and 7} \\ l' \bmod 2 + 5 & \text{for non-special subframes} \end{cases}$$

$$l = \begin{cases} 0, 1, 2, 3 & \text{for } n_s \bmod 2 = \text{special subframe configurations 1, 2, 6, and 7} \\ 0, 1 & \text{for } n_s \bmod 2 \text{ and special subframe configurations 1, 2, 6, and 7} \\ 2, 3 & \text{for } n_s \bmod 2 = 1 \text{ and special subframe configurations other than 1, 2, 6, and 7} \end{cases}$$

$$m' = 0, 1, 2$$

As noted from [Equation 2], the following orthogonal sequences $\overline{w}_p(i)$ listed in [Table 3] are used as RS sequences according to antenna ports, for mapping to complex-valued modulation symbols.

TABLE 1

| antenna port p | [$\overline{w}_p(0)$ $\overline{w}_p(1)$ $\overline{w}_p(2)$ $\overline{w}_p(3)$] |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Channel estimation may be performed using DMRSs in different manners according to spreading factors of 2 and 4.

Referring to [Table 1], orthogonal sequences for antenna ports 7 to 10 are [a b a b] and thus have a spreading factor of 2. Orthogonal sequences for antenna ports 11 to 14 have a spreading factor of 4. In the case of the spreading factor of 2, a UE may despread DMRSs in first and second slots separately with the spreading factor of 2 and then perform channel estimation by time interpolation. In the case of the spreading factor of 4, the UE may despread DMRSs in an entire subframe at one time with the spreading factor of 4 and perform channel estimation.

The afore-described channel estimation based on a spreading factor may offer a gain from time interpolation with high mobility and a decoding time gain from DMRS despreading in a first slot in the case of spreading factor 2, and may support more UEs or a higher rank in the case of spreading factor 4.

Figure 7:
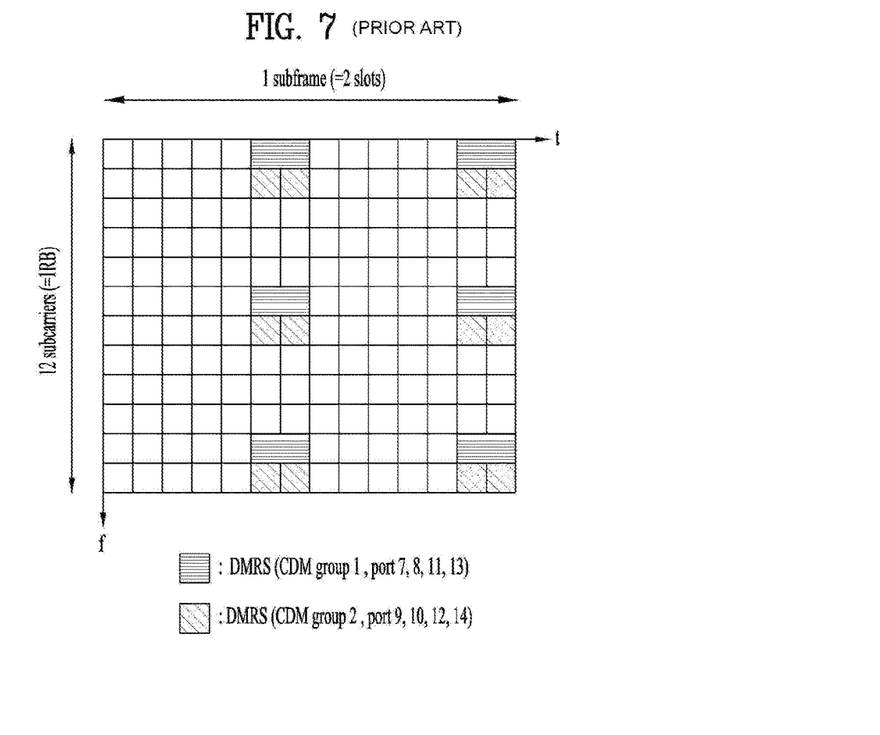
FIG. 7 illustrates Code Division Multiplexing (CDM) groups.

DMRS overhead will be described with reference to FIG. 7. FIG. 7 illustrates mapping of DMRSs for antenna ports 7 to 14 to a subframe. Referring to FIG. 7, Code Division Multiplexing (CDM) group 1 (or a first antenna port set) and CDM group 2 (or a second antenna port set) may be defined according to the positions of DMRSs mapped to a resource grid. The REs of CDM group 1 carry DMRSs through antenna ports 7, 8, 11, and 13, whereas the REs of CDM group 2 carry DMRSs through antenna ports 9, 10 12, and 14. In other words, the DMRSs for the antenna ports of the same CDM group are transmitted in the same REs. If DMRSs are transmitted only through the antenna ports of CDM group 1, resources required for the DMRSs are 12 REs, that is, the DMRS overhead is 12. Likewise, if the antenna ports of CDM group 2 are additionally used, the DMRS overhead is 24.

Positioning Reference Signal (PRS)

PRS is an RS introduced to estimate the position of a UE. A PRS is transmitted through antenna port 6. Like CSI-RSs, a subframe carrying PRSs may be predetermined on a PRS configuration index basis and a frequency band carrying PRSs may be indicated by higher-layer signaling. REs carrying a PBCH, a PSS, or an SSS do not deliver PRSs irrespective of antenna ports through these signals are transmitted. That is, the PBCH and the synchronization signals are protected with priority over the PRS.

Figure 8:
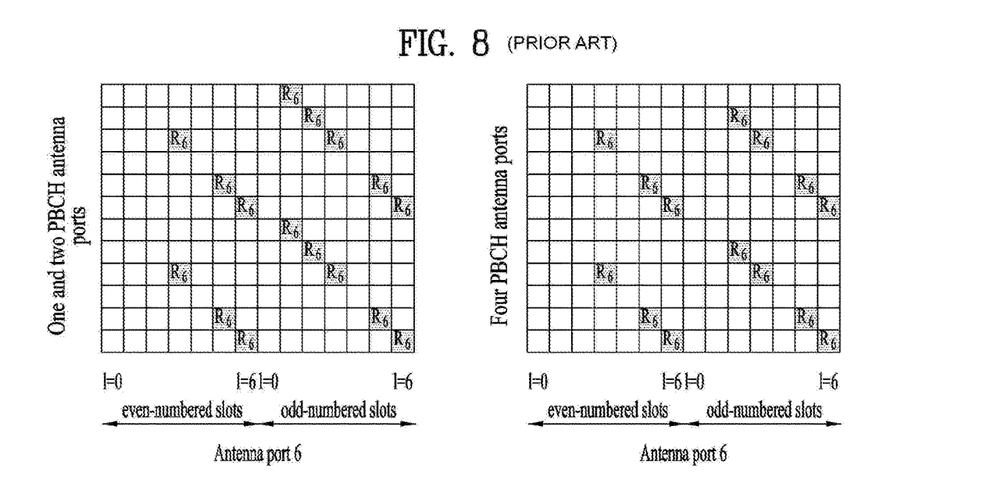
FIG. 8 illustrates Positioning Reference Signal (PRS)

FIG. 8 illustrates REs used for PRS transmission in the case of normal CP. If there are one or two PBCH antenna ports (FIG. 8(a)), one more OFDM symbol may be used for PRS transmission than if there are four PBCH antenna ports (FIG. 8(b)). Further, since REs used for PRS transmission are determined using a cell ID-based v-shift value ($v_{shift}=N_{ID}^{cell}$ mod 6), different PRS transmission REs may be defined for each cell ID.

Enhanced-PDCCH (EPDCCH)

As a solution to lack of PDCCH capacity caused by Coordinated Multi-Point (CoMP), Multi User-Multiple Input Multiple Output (MU-MIMO), etc. and a decrease in PDCCH performance caused by Inter-Cell Interference (ICI), etc., an EPDCCH transmittable in a legacy PDSCH region is under consideration for an LTE system beyond Release 11. Compared to a legacy CRS-based PDCCH, channel estimation may be performed on the EPDCCH based on DMRSs in order to achieve a precoding gain. These DMRSs may be referred to as EPDCCH-associated DMRSs to be distinguishable from DMRSs used for channel estimation for PDSCH decoding, PDSCH-associated DMRSs.

To receive/acquire DCI through an EPDCCH, a UE may perform blind decoding in a similar manner to in the legacy LTE/LTE-A system. More specifically, the UE may attempt to decode (may monitor) a set of EPDCCH candidates with respect to DCI formats corresponding to a TM configured for the UE, for each aggregation level. The set of EPDCCH candidates that are monitored may be called an EPDCCH UE-specific Search Space (USS). This search space may be configured on an aggregation level basis. Aggregation levels 1, 2, 4, 8, 16, and 32 are available according to a subframe type, a CP length, and the amount of available resources in a PRB pair, which is a difference from the afore-described legacy LTE/LTE-A system.

A UE for which an EPDCCH has been configured indexes REs of a PRB pair set as EREGs and indexes the EREGs as ECCEs. The UE may receive control information by determining EPDCCH candidates forming a search space based on the indexed ECCEs and blind-decoding the EPDCCH candidates. In concept, EREG corresponds to REG in LTE/LTE-A and ECCE corresponds to CCE in LTE/LTE-A. One PRB pair may include 16 EREGs.

EPDCCH transmission types may be categorized into localized EPDCCH transmission and distributed EPDCCH transmission according to the configurations of PRB pairs used for the EPDCCH transmissions. In localized EPDCCH transmission, ECCEs used for transmission of one DCI are contiguous in the frequency domain. To achieve a beamforming gain, a specific precoding may be applied to the localized EPDCCH transmission. For example, localized EPDCCH transmission may be based on as many contiguous ECCEs as an aggregation level. In contrast, one EPDCCH is transmitted in PRB pairs distributed in the frequency domain in distributed EPDCCH transmission. The distributed EPDCCH transmission has a frequency diversity gain. For example, the distributed EPDCCH transmission may be carried out based on ECCEs each including 4 EREGs included in each of the PRB pairs distributed in the frequency domain (8 EREGs for special subframe configurations 1, 2, 6, 7 and 9 and an extended CP).

One or more sets of PRB pairs (EPDCCH PRB sets) available for localized EPDCCH transmission or distributed EPDCCH transmission may be configured for a UE and one EPDCCH PRB set may include N (one of 1, 2, 4, 8, and 16) PRB pairs. Each EPDCCH PRB set may have a different value of N and an overlapped PRB pair. The number of EPDCCH PRB sets and the number N of PRB pairs in each EPDCCH PRB pair may be signaled to the UE.

Channel estimation for EPDCCH decoding may be performed using EPDCCH-associated DMRSs. The EPDCCH-associated DMRSs may be transmitted through antenna ports 107, 108, 109, and 110, which may belong to different CDM groups (i.e. using different orthogonal codes and mapped to the same REs). For details, the afore-given description of DMRSs may be referred to.

The transmission areas of the afore-described PRSs and EPDCCH-associated DMRSs (or EPDCCH) may be overlapped in time-frequency resources. This is because the LTE/LTE-A system regulates that if PRSs are overlapped with a PBCH or PSS/SSS, the PRSs should not be mapped to corresponding REs, without specifying an action to be taken in the case where PRSs are overlapped with EPDCCH-associated DMRSs. Accordingly, PRSs may be transmitted overlapped with EPDCCH-associated DMRSs, resulting in serious degradation of EPDCCH channel estimation performance.

To solve the above problem, an operation of a UE in the case where EPDCCH-associated DMRSs (an EPDCCH PRB set) are overlapped with PRSs (in the same subframe and/or the same PRB pair) will be described. The UE may determine whether an EPDCCH is transmitted or an EPDCCH search space (or an EPDCCH set) or EPDCCH candidates are skipped, taking into account an EPDCCH transmission environment (an EPDCCH transmission type, an overlap range, etc.) in a resource area (a subframe, a PRB pair, etc.) in which PRSs are overlapped with EPDCCH-associated DMRSs. More specifically, a UE configured to monitor EPDCCHs may receive a subframe including one or more EPDCCH PRB sets and attempt to decode (blind-decode, that is, monitor) EPDCCH candidates in each EPDCCH PRB set (on an aggregation level basis). If the transmission area of an EPDCCH PRB set is overlapped with a PRS transmission area, information about EPDCCH candidates (e.g., the number of EPDCCH candidates, as described later) or information about decoding (e.g., an ECCE configuration, information about antenna ports allocated to ECCEs, etc.) may be determined differently according to at least one of an EPDCCH transmission type and a cell ID. While the above and following descriptions are given mainly focusing on overlap between PRSs and EPDCCH-associated DMRSs (or an EPDCCH PRB set), the present invention is also applicable to other signals/RSs than PRSs, which are overlapped with EPDCCH-associated DMRSs (or an EPDCCH monitoring (subframe) set) or an EPDCH PRB set). Also, 'corresponding subframe' may mean a subframe in which a PRS transmission area is partially overlapped with an EPDCCH PRB set/EPDCCH-associated DMRSs and 'overlap' means transmission of a PRS in a corresponding RE in the following description.

Embodiment 1

A first embodiment of the present invention pertains to a case where PRSs are overlapped with an EPDCCH PRB set/EPDCCH-associated DMRSs. Particularly, the first embodiment of the present invention may be useful when the transmission type of an EPDCCH PRB set is localized EPDCCH transmission.

In the above case, the number of EPDCCH candidates may be determined according to the size of an EPDCCH PRB set, taking into account PRB pairs overlapped with a PRS transmission area. The size of an EPDCCH PRB set based on PRB pairs overlapped with a PRS transmission area may be the number of PRB pairs included in the EPDCCH PRB set, which does not exceed the difference obtained by subtracting the number of the PRB pairs overlapped with the PRS transmission area from the number of PRB pairs included in the EPDCCH PRB set, indicated by higher-layer signaling (e.g., RRC signaling). That is, a UE may configure a search space using ECCEs including only resources that do not collide with PRSs and rearrange EPDCCH candidates in the search space.

More specifically, if the size of an EPDCCH PRB set configured for a UE is 4, that is, the number of PRB pairs included in the EPDCCH PRB set is 4 (this may be indicated to the UE by higher-layer signaling), the UE may determine the numbers of EPDCCH candidates for respective aggregation levels to be 6, 6, 2, and 2, respectively, referring to [Table 2] and perform blind decoding accordingly. If one PRB pair is overlapped with the PRB transmission area, the UE may determine the number of EPDCCH candidates based on a value 2 available as the number of PRB pairs included in the EPDCCH PRB set that does not exceed 3 obtained by subtracting the number 1 of overlapped PRB pairs from the number 4 of PRB pairs included in the EPDCCH PRB set indicated by higher-layer signaling. In this example, the UE uses the number of candidates for an EPDCCH set size of 2 as the number of EPDCCH candidates.

TABLE 2

| Number of PRB pairs included in EPDCCH PRB set | Number of EPDCCH candidates | | | |
| --- | --- | --- | --- | --- |
| | Aggregation level 1 | Aggregation level 2 | Aggregation level 3 | Aggregation level 4 |
| 2 | 8 | 4 | 2 | 1 |
| 4 | 6 | 6 | 2 | 2 |
| 8 | 6 | 6 | 2 | 2 |

(The above [Table 2] is purely exemplary and thus may be changed according to the number of EPDCCH PRB sets).

The example is for localized EPDCCH transmission. The example may provide an operation for the case where a part of signaled PRB pairs are overlapped with a PRS transmission area and a UE assumes that an EPDCCH is not transmitted in the overlapped PRB pair. Another operation available to the UE in this case may be that the UE assumes that an EPDCCH may be transmitted in the remaining PRB pairs except for the PRB pair overlapped with the PRS transmission area in the PRB pairs signaled for the usage of EPDCCHs. In other words, the UE may consider only an EPDCCH candidate existing in a PRB pair not overlapped with the PRS transmission area in the EPDCCH PRB set to be a valid EPDCCH candidate. This implies that when all or a part of the resources of an EPDCCH candidate is included in an overlapped PRB pair, it is assumed that the EPDCCH candidate is skipped.

If two or more EPDCCH PRB sets are configured for the UE and any of the EPDCCH PRB sets collides with a PRS transmission area, only a non-collided EPDCCH PRB set may be assumed to be a valid set.

The above methods may be selectively used according to the number of PRB pairs overlapped with a PRS transmission area. For example, if the number of PRB pairs not overlapped with the PRS transmission area is smaller than a predetermined value 2, the corresponding EPDCCH PRB set may be considered to be an invalid EPDCCH PRB set.

Embodiment 2

A second embodiment of the present invention is especially effective when the transmission type of an EPDCCH PRB set overlapped with PRSs is distributed EPDCCH transmission. Nonetheless, the second embodiment of the present invention is also applicable to localized EPDCCH transmission.

If a subframe (i.e., a subframe carrying PRSs) is included in an EPDCCH monitoring set, a UE may assume that no EPDCCH is transmitted. In other words, an EPDCCH supposed to be transmitted in a USS may not be transmitted due to overlap between an EPDCCH monitoring set and a PRS subframe. This may imply that the UE may not attempt to detect an EPDCCH USS in the subframe, that is, the UE performs only blind-decoding on a CSS of a PDCCH.

Further, the UE may detect a USS in a PDCCH region irrespective of whether the subframe is included in the EPDCCH monitoring set. That is, the UE should monitor both the CSS and the USS in the PDCCH region of the subframe.

If two or more EPDCCH PRB sets are configured for the UE and any of the EPDCCH PRB sets collides with a PRS transmission area, the UE may assume only a non-collided EPDCCH PRB set to be a valid set.

Embodiment 3

Although an EPDCCH PRB set/EPDCCH-associated DMRSs are co-existent with PRSs in the same PRB pair, PRS REs and DMRS REs may or may not collide according to a cell ID. A third embodiment of the present invention pertains to a UE operation in this case.

Figure 9:
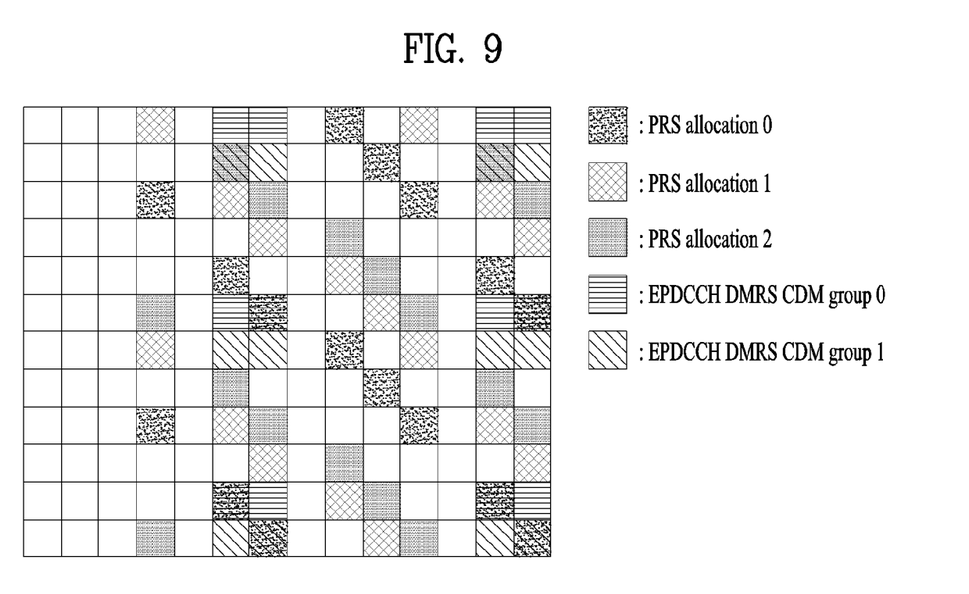
FIG. 9 illustrates an embodiment of the present disclosure.

FIG. 9 illustrates such an example. PRS allocation 0 represents PRS REs with v-shift 0, PRS allocation 1 represents PRS REs with v-shift 2, and PRS allocation 2 represents PRS REs with v-shift 3. As described before, v-shift is a value determined according to a cell ID (Cell ID mod 6).

In the case of PRS allocation 0, PRS REs are overlapped with DMRS REs of CDM group 0 (e.g., antenna ports 7 and 8) and CDM group 1 (e.g., antenna ports 9 and 10). In this case, since all of DMRSs used for EPDCCH transmission are affected by PRSs, it is preferred that an EPDCCH is not transmitted in a PRS transmission area (a PRB pair in FIG. 9).

In the case of PRS allocation 1, no PRSs collide with DMRS REs of any CDM group. Therefore, there is no problem with channel estimation for an EPDCCH. However, an overlap with PRS REs occurs in an area carrying the EPDCCH. Thus, demodulation performance may be supplemented by rate matching or puncturing (e.g., insertion of zeroes in corresponding REs) (this method for handling collision between an EPDCCH and PRS REs may be applied to other cases of the present invention).

In the case of PRS allocation 2, PRS REs collide only with DMRS REs of CDM group 1. That is, PRS transmission does not affect DMRSs of CDM group 0. In this case, it is preferred to use only DMRS ports 9 and 10 of CDM group 0 in a corresponding PRB pair. Therefore, ECCE-to-antenna port mapping may be defined as allocation of two ECCEs to one antenna port or configuring one CCE with 8 EREGs in a corresponding PRB pair (i.e. two ECCEs per PRB pair). In other words, if the cell ID of the UE leads to overlap between PRS REs and REs of one of CDM groups of EPDCCH-associated DMRSs, one antenna port may be allocated to two ECCEs in the corresponding PRB pair. Or one ECCE may be configured with 8 EREGs in this PRB pair. Herein, the antenna port allocated to 2 ECCEs may be from a CDM group (antenna ports 9 and 10 in FIG. 9) that has nothing to do with overlap.

The above embodiments are all based on the premise that EPDCCHs are transmitted in different manners according to various factors (a PRS transmission band, PRS allocation, etc.) in order to secure as much available resources as possible. However, due to the resulting possibility of increasing the configuration complexity of a UE, an EPDCCH is not transmitted in a PRB pair overlapped with a PRS transmission band irrespective of an EPDCCH transmission method (e.g., localized/distributed EPDCCH transmission) or the UE may assume that an EPDCCH is not transmitted in a PRB pair overlapped with a PRS transmission band. This is different from the foregoing embodiments in that it is assumed that no EPDCCH is transmitted just due to a transmission band overlap even though DMRSs do not collide with PRSs at an RE level. In this case, control information may be transmitted as follows.

First, the positions of a search space and EPDCCH candidates are configured in a signaled EPDCCH PRB set. If all or part of the resources of an EPDCCH candidate are included in a PRB pair overlapped with a PRS transmission band, only the EPDCCH candidate may be skipped (in distributed EPDCCH transmission, one ECCE includes EREGs distributed across a plurality of PRB pairs and thus the corresponding EPDCCH set may be skipped).

Second, the total number of EPDCCH candidates may be maintained by configuring a new search space excluding a PRB pair overlapped with a PRB band among PRB pairs included in an EPDCCH PRB set. That is, this may be similar to the first embodiment.

Third, if any of PRB pairs included in an EPDCCH PRB set overlaps with a PRS band, it may be assumed that the EPDCCH PRB set is not valid. If one EPDCCH PRB set is configured for a UE and is overlapped with a PRB band, the UE may perform USS decoding in a PDCCH region. If two EPDCCH PRB sets are configured for the UE and one of the EPDCCH PRB sets overlaps with PRSs, the UE may detect a USS only in a non-overlapped EPDCCH PRB set or in the non-overlapped EPDCCH PRB set and a PDCCH.

Irrespective of an EPDCCH transmission method in a subframe carrying PRSs, an EPDCCH may not be transmitted (a UE may assume that an EPDCCH is not transmitted in the PRS subframe). The UE may blind-decode only a CSS of a PDCCH or may perform blind-decoding on the assumption that both a CSS and a USS are transmitted in a PDCCH region, in this subframe.

Configurations of Apparatuses According to Embodiment of the Present Invention

Figure 10:
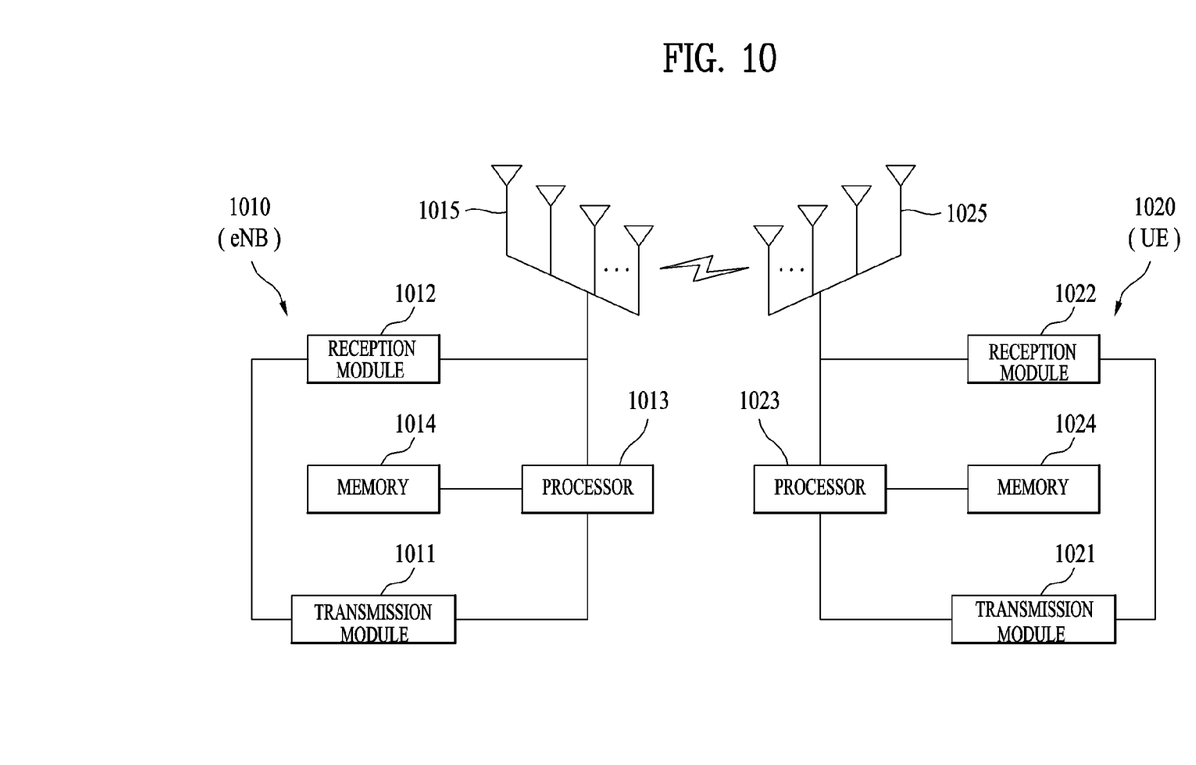
FIG. 10 is a block diagram of a transmission apparatus and a reception apparatus.

FIG. 10 is a block diagram of a transmission point and a UE according to an embodiment of the present invention.

Referring to FIG. 10, a transmission point 1010 according to the present invention may include a reception module 1011, a transmission module 1012, a processor 1013, a memory 1014, and a plurality of antennas 1015. Use of the plurality of antennas 1015 means that the transmission point 1010 supports MIMO transmission and reception. The reception module 1011 may receive UL signals, data, and information from a UE. The transmission module 1012 may transmit DL signals, data, and information to a UE. The processor 1013 may provide overall control to the transmission point 1010.

The processor 1013 of the transmission point 1010 according to the embodiment of the present invention may perform necessary operations in the afore-described embodiments.

Besides, the processor 1013 of the transmission point 1010 processes received information and information to be transmitted to the outside of the transmission point 1010. The memory 1014 may store the processed information for a predetermined time and may be replaced with a component such as a buffer (not shown).

Referring to FIG. 10 again, a UE 1020 according to the present invention may include a reception module 1021, a transmission module 1022, a processor 1023, a memory 1024, and a plurality of antennas 1025. Use of the plurality of antennas 1025 means that the UE 1020 supports MIMO transmission and reception using the plurality of antennas 1025. The reception module 1021 may receive DL signals, data, and information from an eNB. The transmission module 1022 may transmit UL signals, data, and information to an eNB. The processor 1023 may provide overall control to the UE 1020.

The processor 1023 of the UE 1020 according to the embodiment of the present invention may perform necessary operations in the afore-described embodiments.

Besides, the processor 1023 of the UE 1020 processes received information and information to be transmitted to the outside of the UE 1020. The memory 1024 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 1010 in FIG. 10 is applicable to a relay as a DL transmitter or a UL receiver, and the description of the UE 1020 in FIG. 10 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for receiving control information on an Enhanced Physical Downlink Control Channel (EPDCCH) by a User Equipment (UE) in a wireless communication system, the method comprising:
receiving a subframe including one or more EPDCCH Physical Resource Block (PRB) sets; and
attempting to decode one or more EPDCCH candidates in each of the one or more EPDCCH PRB sets,
wherein if a EPDCCH PRB set of the one or more EPDCCH PRB sets is overlapped with a transmission area of a first signal, invalid EPDCCH candidates, which are not attempted to be decoded, are determined according to whether a type of the EPDCCH PRB set is for localized EPDCCH transmission or distributed EPDCCH transmission,
wherein if the EPDCCH PRB set is for localized EPDCCH transmission, EPDCCH candidates included in PRB pairs overlapped with the transmission area of the first signal among PRB pairs included in the EPDCCH PRB set are determined to be invalid, and
wherein if the EPDCCH PRB set is for distributed EPDCCH transmission, all EPDCCH candidates included in the EPDCCH PRB set are determined to be invalid.

2. The method according to claim 1, wherein a number of valid EPDCCH candidates to attempt to decode is determined according to the size of the EPDCCH PRB set, taking into account a PRB pair overlapped with the transmission area of the first signal.

3. The method according to claim 2, wherein the size of the EPDCCH PRB set is a value available as the number of PRB pairs included in the EPDCCH PRB set, which does not exceed a value obtained by subtracting the number of PRB pairs overlapped with the transmission area of the first signal from the number of PRB pairs included in the EPDCCH PRB set, indicated by higher-layer signaling.

4. The method according to claim 3, wherein if the value obtained by subtracting the number of PRB pairs overlapped with the transmission area of the first signal from the number of PRB pairs included in the EPDCCH PRB set, indicated by higher-layer signaling is smaller than a predetermined value, the EPDCCH PRB set is determined to be invalid.

5. The method according to claim 1, wherein
if a cell ID causes overlap between a Resource Element (RE) carrying the first signal and an RE of one of Code Division Multiplexing (CDM) groups of EPDCCH-associated DeModulation Reference Signals (DMRSs), one antenna port is allocated to two Enhanced Control Channel Elements (ECCEs) in a PRB pair overlapped with the transmission area of the first signal.

6. The method according to claim 5, wherein the one antenna port allocated to the two ECCEs belongs to a CDM group other than the one CDM group.

7. The method according to claim 5, wherein the PRB pair overlapped with the transmission area of the first signal is included in an EPDCCH PRB set for localized EPDCCH transmission.

8. The method according to claim 5, wherein if the cell ID causes overlap between a Resource Element (RE) carrying the first signal and an RE of one of CDM groups of EPDCCH-associated DMRSs, one ECCE includes eight Enhanced RE Groups (EREGs) in a PRB pair overlapped with the transmission area of the first signal.

9. The method according to claim 1, wherein the first signal is a Positioning Reference Signal (PRS).

10. A User Equipment (UE) for receiving a downlink signal on an Enhanced Physical Downlink Control Channel (EPDCCH) in a wireless communication system, the UE comprising:
a transceiver that transmits and receives signals to and from a network;
a processor that controls the transceiver; and
a memory that stores instructions for the processor;
wherein the processor:
controls the transceiver to receive a subframe including one or more EPDCCH Physical Resource Block (PRB)

sets, and attempts to decode one or more EPDCCH candidates in each of the one or more EPDCCH PRB sets, and wherein if a EPDCCH PRB set of the one or more EPDCCH PRB sets is overlapped with a transmission area of a first signal, invalid EPDCCH candidates, which are not attempted to be decoded, are determined according to whether a type of the EPDCCH PRB set is for localized EPDCCH transmission or distributed EPDCCH transmission, wherein if the EPDCCH PRB set is for localized EPDCCH transmission, EPDCCH candidates included in PRB pairs overlapped with the transmission area of the first signal among PRB pairs included in the EPDCCH PRB set are determined to be invalid, and wherein if the EPDCCH PRB set is for distributed EPDCCH transmission, all EPDCCH candidates included in the EPDCCH PRB set are determined to be invalid.

* * * * *